United States Patent
Smith et al.

(10) Patent No.: US 6,177,032 B1
(45) Date of Patent: Jan. 23, 2001

(54) POLARIZED OPHTHALMIC LENSES AND METHODS FOR MAKING SAME

(75) Inventors: Michael Barry Smith, Thousand Oaks, CA (US); Gerard Nault, Cumberland, RI (US)

(73) Assignee: Alcat, Incorporated, Milford, CT (US)

( * ) Notice: Under 35 U.S.C. 154(b), the term of this patent shall be extended for 0 days.

(21) Appl. No.: 09/390,588

(22) Filed: Sep. 3, 1999

Related U.S. Application Data (60) Provisional application No. 60/099,449, filed on Sep. 8, 1998.

(51) Int. Cl.[7] .................................................. B29D 11/00
(52) U.S. Cl. ............................ 264/1.34; 264/1.7; 264/2.7; 264/1.32
(58) Field of Search ........................... 264/1.1, 1.7, 1.34, 264/2.7, 1.32

(56) References Cited

U.S. PATENT DOCUMENTS

| | | |
|---|---|---|
| 4,043,637 | 8/1977 | Hovey . |
| 4,950,445 * | 8/1990 | Salce et al. ............................ 264/2.7 |
| 5,051,309 | 9/1991 | Kawaki et al. . |
| 5,308,425 * | 5/1994 | Daff et al. ............................ 264/213 |
| 5,434,707 * | 7/1995 | Dalzell et al. .......................... 264/1.7 |
| 5,648,832 | 7/1997 | Houston et al. . |
| 5,702,813 | 12/1997 | Murata et al. . |
| 5,757,459 | 5/1998 | Bhalakia et al. . |
| 5,800,744 * | 9/1998 | Munakata .............................. 264/1.7 |

FOREIGN PATENT DOCUMENTS

WO 97/38345  10/1997  (WO) .

* cited by examiner

*Primary Examiner*—Mathieu D. Vargot
(74) *Attorney, Agent, or Firm*—Maurice M. Klee (57) ABSTRACT

A laminated light-polarizing composite lens is efficiently produced by bonding a pre-formed polarized sheet to the front convex surface of a molded polycarbonate lens in an autoclave. Excellent optical properties are obtained by the replication from a polished glass surface to the front surface of the lens. The outer surface layer of the finished lens is isotropic and thus does not produce unwanted birefringence effects. The method is especially well suited for the production of optically corrected decentered polycarbonate lenses. The process is simple and easily changed to produce lenses with different base curves and colors.

9 Claims, 8 Drawing Sheets

POLARIZED OPHTHALMIC LENSES AND METHODS FOR MAKING SAME

CROSS REFERENCE TO RELATED PROVISIONAL APPLICATION

This application claims the benefit under 35 USC §119(e) of U.S. Provisional Application No. Serial No. 60/099,449, filed Sep. 8, 1998, the content of which in its entirety is hereby incorporated by reference.

FIELD OF THE INVENTION

This invention relates to polarized ophthalmic lenses and to methods for making such lenses. More particularly, the invention relates to polarized ophthalmic lenses which are produced by: (1) constructing a light polarizing sub-laminate, (2) vacuum forming the light polarizing sub-laminate into a substantially spherically-shaped shell, and (3) laminating the shell to a lens blank.

BACKGROUND OF THE INVENTION

Ophthalmic lenses incorporating light-polarizing films are well known and have been produced for some time. Such lenses are used in sunglasses, sports goggles, fashion eyewear, and the like. The lenses can be prescription lenses with a net optical power or plano lenses with no net power, including decentered plano lenses (see, for example, Houston et al., U.S. Pat. No. 5,648,832). The light polarizing film performs the important function of reducing sun glare, including sun glare from water and snow.

Unfortunately, the incorporation of light polarizing properties into ophthalmic lenses in a cost effective and efficient manner has proved to be a technical challenge, especially for plastic lenses composed of such materials as polycarbonates, allyl diglycol carbonates (ADC), and acrylics. Various proposals directed to this problem can be found in, for example, Hovey, U.S. Pat. No. 4,043,637, Kawaki et al., U.S. Pat. No. 5,051,309, Murata et al., U.S. Pat. No. 5,702,813, Bhalakia et al., U.S. Pat. No. 5,757,459, PCT Patent Publication No. WO 97/38345, and co-pending and commonly assigned U.S. patent application Ser. No. 08/637,360, filed Apr. 25, 1996, and entitled "Polarized Plastic Laminates," the contents of all of which are incorporated herein by reference.

One method which has been used to manufacture polarized lenses involves laminating or gluing a pre-formed piece of polarized sheet to the outer convex surface of a glass or plastic lens blank which is then edged and inserted into suitable eyeglass frames. Polarized sheets for these applications have had a three layer sandwich construction, the two outer layers being cellulose acetate butyrate and the center layer being a thin polyvinyl alcohol polarizing film. The overall sheet thickness has been in the range of 0.010"–0.030". As a result, lenses produced by this approach have generally been too thick and have not been widely used. Also, their optical properties have generally been poor as a result of the thickness of the polarized sheet.

PCT Patent Publication No. WO 97/38345, referred to above, discloses a process for producing polarized lenses by laminating polarizing sheets to or between flat sheets of plastic materials such as acrylic, styrene or polycarbonate. The laminates are then heat and pressure formed to the desired lens curvature.

Light-polarizing lenses have also been produced by placing a pre-formed piece of a thin polarizing film into a glass or metal mold which is then filled with a thermosetting plastic monomer, such as an allyl diglycol carbonate (e.g., CR-39), followed by polymerization or curing to produce a lens. In this process, the monomer surrounds and thus encapsulates the polarizing film. After removal from the mold, the lens is ground, edged and finished into a prescription or sunglass lens.

Polycarbonate lenses for all types of eyewear have recently become increasingly popular because of their ease of manufacture, light weight, and high impact and shatter resistance. The increased usage of polycarbonate lenses for eyewear has been driven both by fashion and safety concerns, especially in connection with lenses which are to be worn during sports activities.

A process has been developed for the manufacture of injection molded polarized polycarbonate lenses in which a disc of pre-formed polycarbonate polarized sheet, approximately 0.028" thick, is placed into and in contact with the concave cavity of a polished steel mold which is then closed and injected with polycarbonate resin to form a lens. The molten polycarbonate fuses to the rear concave polycarbonate surface of the polarized sheet thus forming a lens.

Many problems exist with this process which result in high costs and low yields. For example, forming the polycarbonate polarized sheet is difficult and requires expensive tooling to obtain the correct curve to match the polished steel cavity. Moreover, the polycarbonate polarized sheet must be able to withstand the high temperatures necessary to injection mold the polycarbonate resin. Most polarized sheets or films decompose at these temperatures, which results in reduced polarizer efficiency and/or low manufacturing yields.

In addition, it is very difficult to mold polycarbonate lenses of this type without creating residual birefringence which reduces or destroys polarizing efficiency. In particular, excessive shrinkage of the molded "sandwich" produces birefringence in the finished lens, as well as optical distortion. In addition to the foregoing problems, the mold cavities needed for this process are expensive to build and require a high degree of maintenance.

SUMMARY OF THE INVENTION

In view of the foregoing, it is an object of this invention to provide improved methods for producing polarized ophthalmic lenses.

More particularly, it is an object of the invention to provide simple and efficient methods for producing polarized ophthalmic lenses which methods have some and preferably all of the following properties: 1) the methods produce lenses having good polarizing efficiency, 2) the methods produce lenses having a low level of birefringence, 3) the methods produce lenses having excellent optical properties, 4) the methods can be used to produce lenses having a wide range of base curves, including high base curves, e.g., 8 or 9 base curves, 5) the methods can be used to produced optically corrected decentered lenses, including optically corrected decentered lenses having high base curves, 6) the methods can be used to produce colored lenses, 7) the methods can be used to produce lenses which include a UV absorber, 8) the methods can be used to produce thin lenses, and 9) the methods can be used to produce polycarbonate lenses.

It is also an object of the invention to provide improved polarized ophthalmic lenses having some and preferably all of the above properties.

To achieve these and other objects, the invention in accordance with certain of its aspects provides a method for producing a light polarizing sub-laminate 6 comprising:

(a) providing a sheet which comprises in order (i) a light polarizing layer 2 comprising a stretched polyvinyl alcohol film containing a polarizing dye, (ii) an isotropic support layer 1 for the light polarizing layer, and (iii) a protective removable skin 8, e.g., an EVA-coated polyethylene sheet;

(b) treating the light polarizing layer 2 with a siloxane coupling agent, e.g., an amino-organo-silane coupling agent;

(c) laminating a polyurethane layer 3 to the treated light polarizing layer 2; and (d) forming at least one curved cavity, specifically, a spherically-shaped or substantially spherically-shaped cavity, in the sheet by supporting the sheet on a plate 10 having at least one opening 12, heating the sheet, and applying a vacuum to the protective removable skin 8 to "drop" the sheet into the opening.

In accordance with others of its aspects, the invention provides a method for producing a light polarizing subassembly comprising:

(a) providing a mold having at least one concave precision mold cavity, e.g., a cavity formed by a polished glass or metal mold insert;

(b) inserting a light polarizing sub-laminate 6 having a first surface and a second surface into the precision mold cavity with the first surface contacting the concave precision mold cavity and the second surface defining a concave cavity for receiving a lens blank;

(c) inserting a lens blank 4 into the concave cavity defined by the second surface, e.g., a spherical, cylindrical, and/or aspherical lens blank; and (d) autoclaving the light polarizing sub-laminate 6 and the lens blank to form the light polarizing subassembly, said autoclaving causing the first surface to acquire the shape of the concave precision mold cavity.

In accordance with further of its aspects, the invention provides a laminated light polarizing subassembly for an ophthalmic lens, said subassembly having an inner surface and a convex outer surface, said subassembly consisting in order from its inner surface to its outer surface of:

(a) a plastic optical blank 4 having a convex outer surface; and (b) a vacuum-formed light polarizing sub-laminate 6 having a concave inner surface and a convex outer surface, said sub-laminate consisting from its inner to its outer surface of:

(i) a polyurethane layer 3 which bonds to the outer convex surface of the plastic optical blank 4;

(ii) a light polarizing layer 2 comprising a minimally-borated borated stretched polyvinyl alcohol film containing a polarizing dye; and (iii) an isotropic support layer 1 for the light polarizing layer 2;

wherein the vacuum-formed light polarizing sub-laminate 6 is laminated to the plastic optical blank 4 at elevated temperature and pressure.

The optical blank can be composed of various plastic materials including polycarbonates, modified polycarbonates, allyl diglycol carbonates, acrylics, and the like. Polycarbonate lens blanks are preferred. If a tinted lens is desired, a tinted polycarbonate lens blank can be used in the practice of the invention.

When allyl diglycol carbonates are used to form the lens blank, the outer convex surface of the blank is preferably etched in accordance with the procedures described in the above-referenced U.S. patent application Ser. No. 08/637, 360.

The polyurethane of the polyurethane layer is preferably an aliphatic, thermoplastic polyurethane film. Preferably, this layer has a thickness of around 0.003" and a softening point of about 180° F. Suitable polyurethane films for use in the present invention are available from Deerfield Polyurethane Company, Deerfield, Mass. Rather than using a film, the polyurethane layer can be formed by dipping the light polarizing layer into a polyurethane coating solution, followed by curing or drying to form the polyurethane layer. Spraying or spin coating can also be used if desired. The polyurethane layer can include a UV absorber and/or can be dyed in accordance with the procedures disclosed in the above-referenced U.S. patent application Ser. No. 08/637, 360.

The light polarizing layer can be dyed with iodine and potassium iodide or with an organic dichroic dye so as to provide the layer with the requisite polarization properties. Dying with iodine is preferred, although in some cases, e.g., when a tinted lens is desired, organic dichroic dyes may be preferable. The isotropic support layer can be composed of various plastic materials, such as cellulose triacetate (CTA), cellulose acetate butyrate (CAB), and acrylics, CTA being preferred.

As known in the art, light polarizing layers composed of polyvinyl alcohol (PVA) are borated in order to cross-link and thus stabilize the dyed PVA. In accordance with the invention, it has been discovered that the level of boration needs to be held to a minimum to avoid crazing of the polarizing layer during vacuum forming of the polarizing sub-laminate. Low levels of boration also improve the adhesion of the polarizing layer to the polyurethane layer.

Quantitatively, boration levels as low as about 10% of the level used to achieve the highest level of PVA stability have been found to work successfully in the practice of the invention, e.g., a boration level of about 9% compared to full boration. Higher or lower levels can, of course, be used if desired. The specific level which is suitable for any particular application of the invention (the "minimally-borated" level) can be readily determined by persons skilled in the art based on the disclosure herein. In particular, using routine experimentation, such persons can determine the level which: (1) eliminates crazing during vacuum forming (thermoforming); (2) provides sufficient bonding of the PVA film to the polyurethane layer; and (3) sufficiently stabilizes the PVA layer so as to provide the finished lens with the desired polarizing properties.

As used herein, boration levels refer to the length of time and/or other process conditions used to borate a dyed PVA film. For example, if full boration is achieved in 90 seconds, a suitable boration time to achieve the minimally-borated level desired for the PVA films used in the present invention can be around 8 seconds.

Polarized ophthalmic lenses are produced from the light polarizing subassemblies of the invention using various conventional edging, shaping, and coating techniques known in the art. For example, the subassemblies can be hardcoated with thermally-curable poly-siloxanes or UV-curable polyacrylates. Similarly, in addition to hardcoatings, mirror or anti-reflective coatings can be applied to the outer surface of the lens and anti-fogging and/or anti-reflective coatings can be applied to the inner surface. Other variations in the production of prescription and non-prescription lenses, known in the art, can be used in the practice of the invention.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

The reference numbers used in the drawings correspond to the following:

1 isotropic support layer for the light polarizing layer, e.g., a cellulose triacetate (CTA) support sheet
2 light polarizing layer, e.g., a minimally-borated, iodine-dyed stretched polyvinyl alcohol (PVA) film
3 polyurethane layer, e.g., a thin aliphatic polyurethane adhesive film
4 lens blank, e.g., a molded polycarbonate lens blank
5 hardcoat layers
6 light polarizing sub-laminate of layers 1, 2, and 3
7 laminate of layers 1 and 2
8 protective layer
10 top plate of vacuum forming apparatus
12 machined opening in top plate 10
13 base of vacuum chamber
14 vacuum port of vacuum chamber
16 vacuum chamber
18 fixture, e.g., polypropylene slab with machined out spherical cavities
20 precision molds, e.g., polished glass molds
22 vacuum blanket, e.g., a silicone rubber vacuum blanket

DESCRIPTION OF THE PREFERRED EMBODIMENTS

As discussed above, in accordance with its preferred embodiments, the present invention provides light-polarizing polycarbonate lenses by laminating a pre-formed piece of a thin polarized film to the front convex surface of an injection molded polycarbonate lens using elevated high temperature and pressure in an autoclave. The thin polarized film is coated on one surface with a polysiloxane coupling agent to promote adhesion to a thin optically clear polyurethane adhesive film which, in turn, adheres to the molded polycarbonate lens.

The polyurethane film, the polarized film, and an isotropic support layer for the polarized film are thermoformed to the same base curve as the front convex surface of the polycarbonate lens. This process is especially suited for a wide range of base curves, particularly 8 and 9 base optically corrected decentered lenses.

The resulting sub-laminate and the molded polycarbonate lens are assembled by placing them into a polished glass mold which itself has been placed into a spherical concave cavity in a thick flat sheet of, for example, polypropylene. During autoclaving, the components are pressed into the polished glass mold which has the desired front surface curvature of the finished lens. The process thus results in excellent optical quality since the finished lens directly replicates the polished surface of the glass mold. After lamination, the lens is removed, trimmed and hardcoated on both front and rear surfaces by methods well known to those skilled in the art.

One of the shortcomings of polarized films is the limited availability of a broad range of colors. The process of the invention allows lenses to be produced in almost any color, which is useful in the ever-changing field of sport and fashion eyewear. Color can be introduced by pre-coloring the resin used to mold the polycarbonate blanks, a procedure which is especially useful when long production runs are expected. Color can also be introduced by dying the polyurethane adhesive film with suitable dyes. This approach is especially advantageous for quick color changes for short runs or for producing a variety of colors using only clear polycarbonate lenses.

Figure 1:
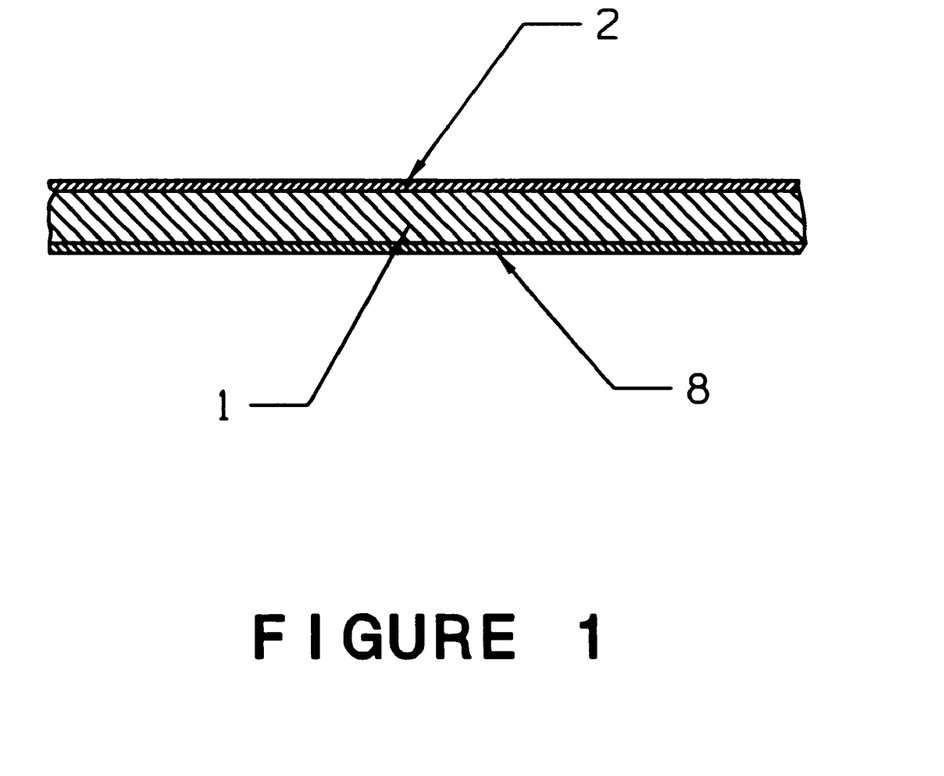
FIG. 1 is a cross-sectional view of a polarizing sheet for use in preparing the polarized ophthalmic lenses of the invention.

As shown in FIG. 1, the sub-laminate of the invention is prepared using a very thin light polarizing film 2 which is composed of stretched polyvinyl alcohol dyed with iodine and stabilized with a minimal level of borates and is laminated to a thicker support sheet 1 composed of cellulose triacetate. This polarizing film/support sheet combination can be 0.003"–0.030" thick with the preferred thickness being about 0.005". Other thicknesses can, of course, be used if desired.

Polarized material is commercially available in sheets or rolls with a thin removable protective film 8, such as ethylene vinyl acetate coated polyethylene, attached to the outer surface of the cellulose triacetate support sheet. This removable film protects the exposed surface of the support sheet during subsequent coating.

The polarized material is cut to the desired size and attached to a suitable rigid frame or rack, which holds the sheet flat. Each sheet is dip coated by being immersed in a tank containing a solution composed of alcohol and a polysiloxane coupling agent. For example, each sheet, while attached to the rack, can be immersed in the solution for 2 minutes, rinsed in alcohol, and then dried in a convection oven at 120° F. for 30 minutes. The oven drying cures the siloxane so that it bonds to the outer surface of the polyvinyl alcohol polarizing film 2. After drying, the sheet is removed from the rack. The siloxane-coated surface results in excellent adhesion between the PVA film surface and the polyurethane film adhesive. If the coupling agent is not used adhesion of the final laminate is poor and unacceptable.

Figure 2:
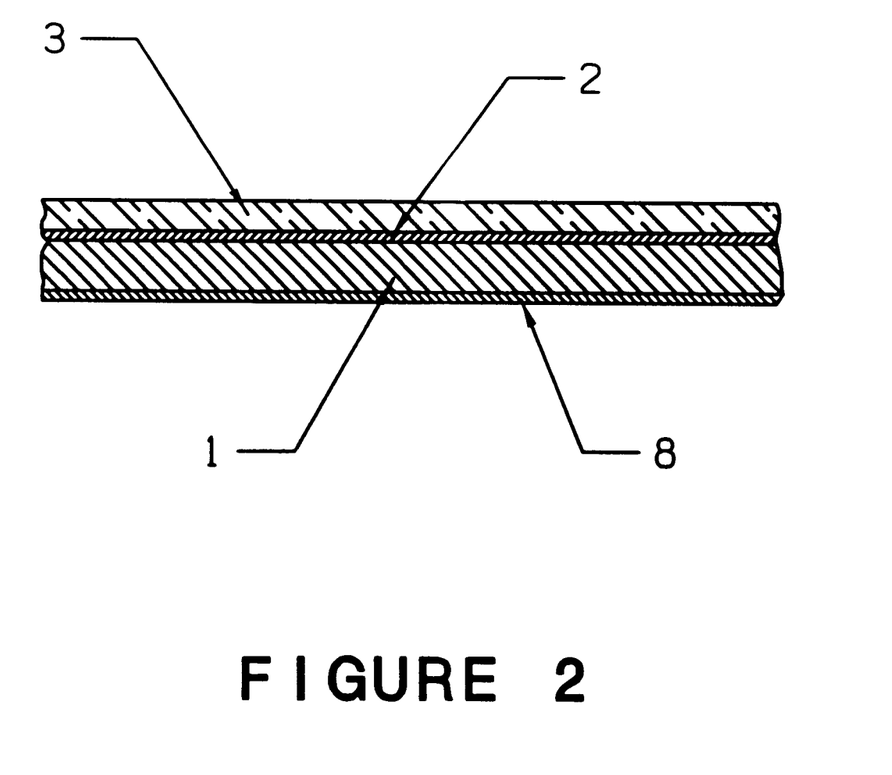
FIG. 2 is a cross-sectional view of the polarizing sheet of FIG. 1 after lamination on one side to a polyurethane layer (polyurethane film adhesive).

As shown in FIG. 2, the next step in the process is to laminate the coated polarized sheet to a thin polyurethane adhesive film 3. This can be done at room temperature by rolling between hard rubber rollers. A suitable thickness for the polyurethane film is about 0.003", although other thicknesses can, of course, be used in the practice of the invention if desired. The adhesive film adheres to the polarized film by this process. All air bubbles and creases are pressed out to provide a smooth surface free of irregularities. This is very important, as surface defects may cause optical distortion in the finished laminated lens.

Figure 3:
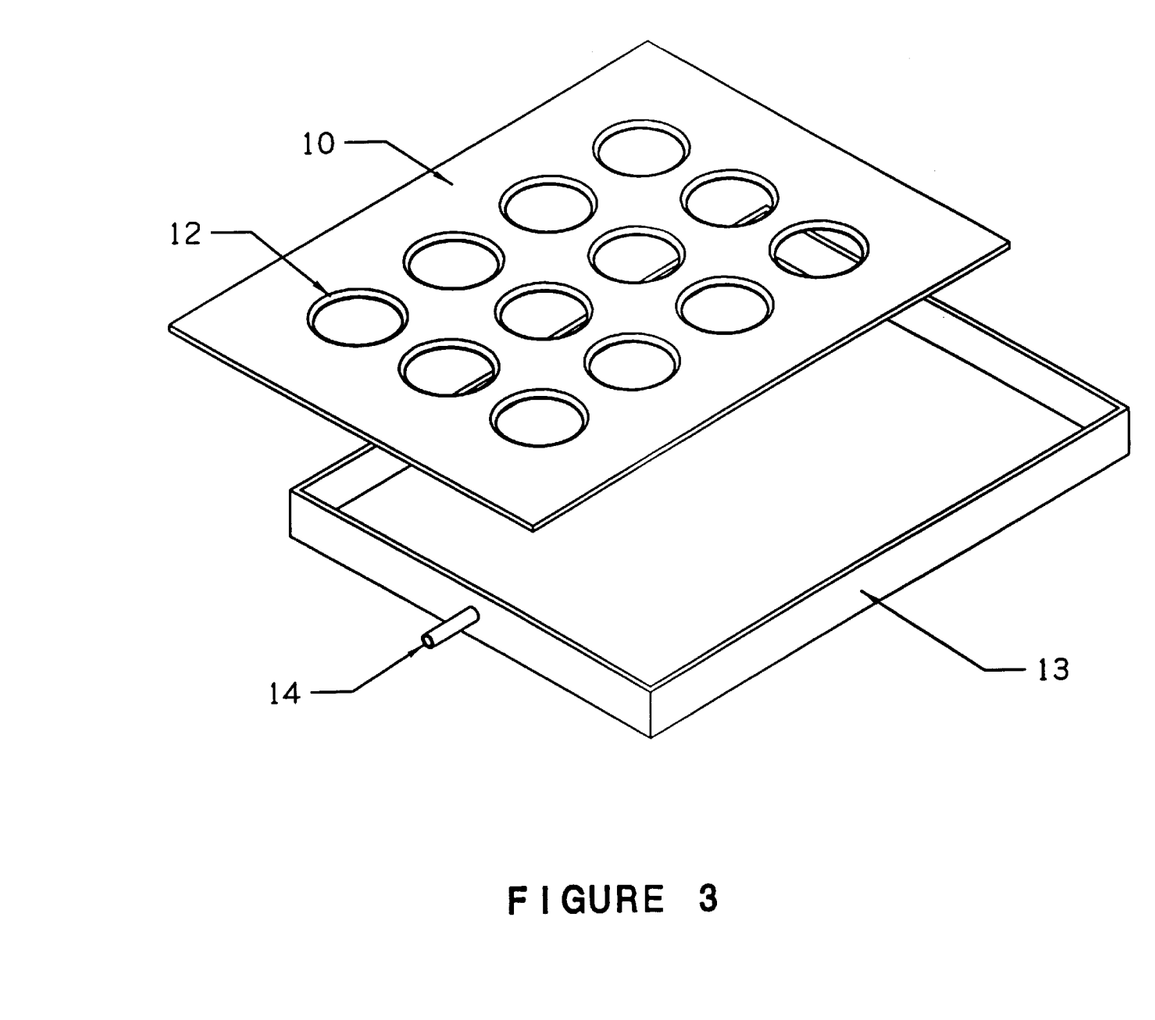
FIG. 3 is an isometric exploded view of a vacuum forming apparatus for producing cavities in the polarizing sheet/polyurethane laminate of FIG. 2.

The polarized film with adhesive film 3 and removable protective film 8 is next thermoformed using the vacuum fixture of FIG. 3. The outer surface of the cellulose triacetate support sheet, with the removable protective film 8 still attached, is placed on the top plate 10 of the vacuum forming fixture with the protective film facing downward. The fixture can, for example, be made of aluminum and can comprise a removable top plate 10, a base 13, and a vacuum port 14 for connection to a suitable vacuum source (not shown). When assembled, the top plate 10 and the base 13 define vacuum chamber 16 (see FIG. 4). Openings 12, having a diameter slightly larger than the diameter of the desired lens, are bored in top plate 10. A rectangular clamp (not shown) is placed around the perimeter of the exposed upper surface of the polyurethane film to provide an air tight seal between the top plate 10 and the protective film 8.

Figure 4:
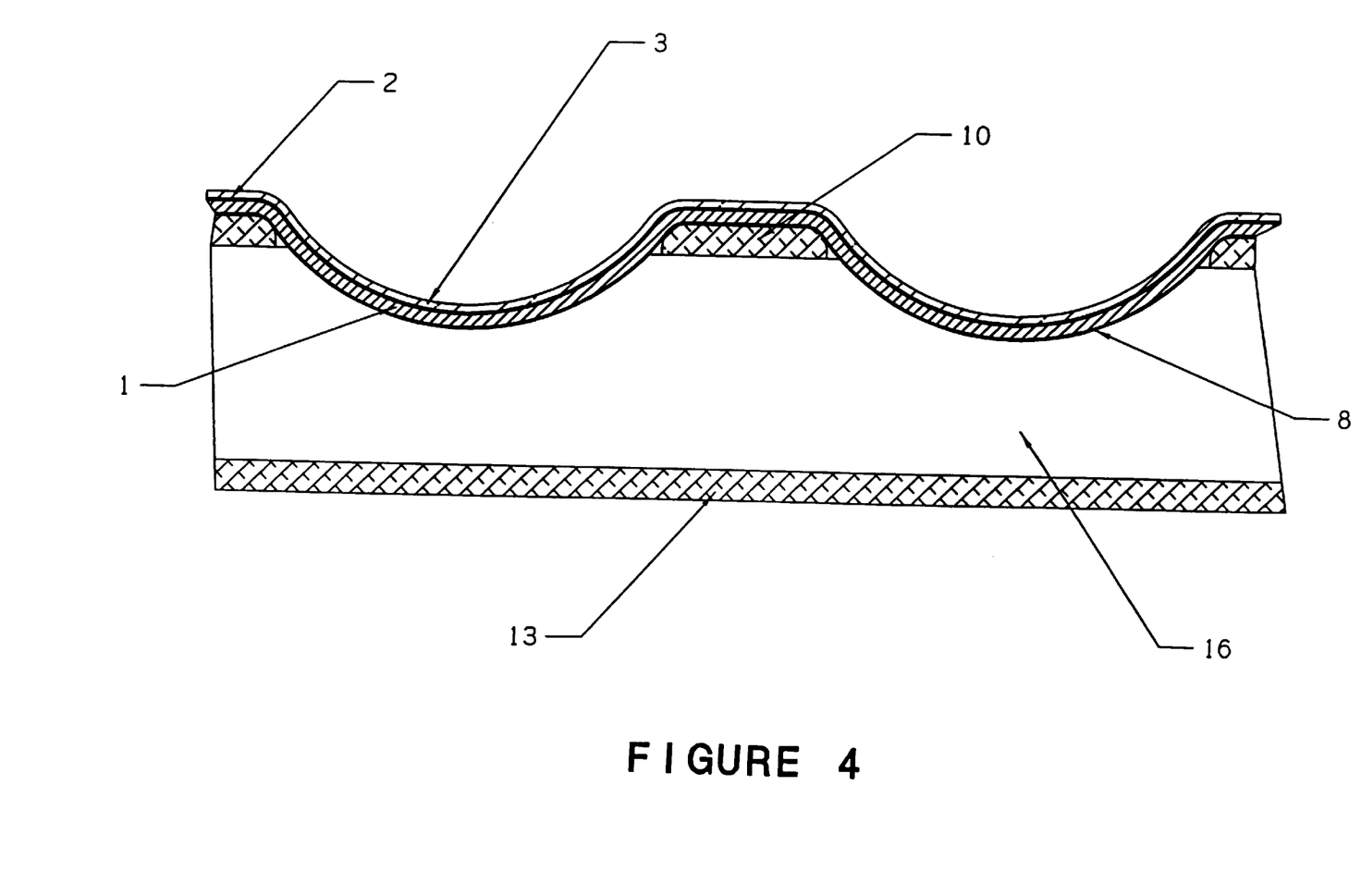
FIG. 4 is a cross-sectional view showing the polarizing sheet/polyurethane laminate of FIG. 2 after thermoforming in the vacuum forming apparatus of FIG. 3.

Thermoforming is accomplished by placing the chamber under an infrared heater. After a few seconds, vacuum is applied by, for example, turning a needle valve. After about 35 seconds, the protective layer/support layer/polarizing layer/adhesive film laminate is drawn into the openings in the top plate. The amount of "drop" is determined by the time, temperature, and vacuum levels used. Using routine experimentation, suitable values for these variables can be readily determined by persons skilled in the art from the present disclosure. The thermoformed laminate has substantially spherically-shaped curvatures between, for example, 2 diopters and 9 diopters.

In practice, it has been found that the polyurethane layer 3 needs to be laminated to the light polarizing layer 2 prior to thermoforming. Although not wishing to be bound by any particular theory of operation, it is believed that the polyurethane layer controls the amount of water which evaporates from the PVA film during thermoforming. Similarly, the protective layer 8 needs to be attached to support layer 1 during the thermoforming process. Without both the protective layer and the polyurethane layer, reliable thermoforming could not be achieved.

Figure 5:
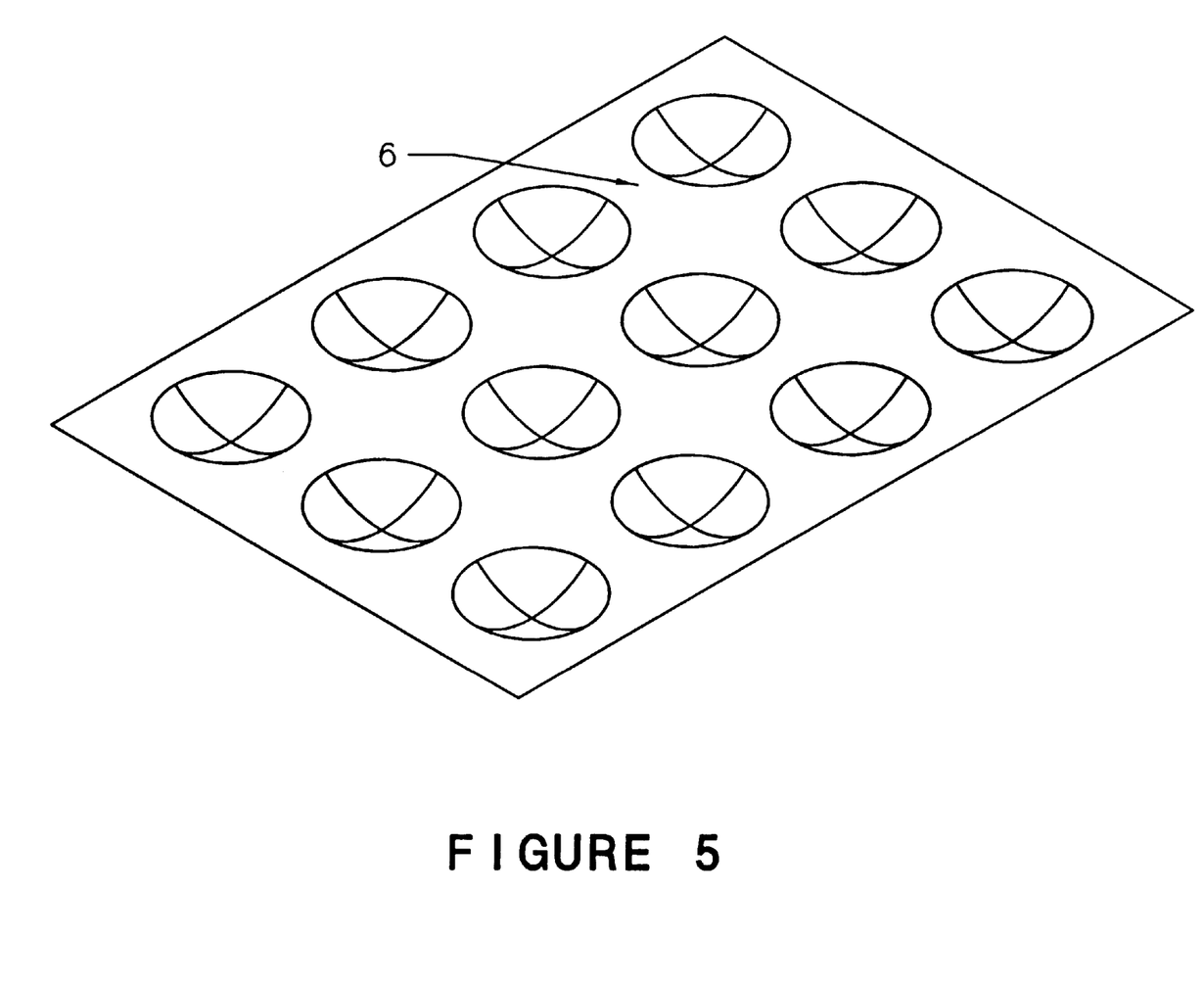
FIG. 5 is an isometric view of the polarizing sheet/polyurethane laminate of FIG. 2 after thermoforming and after removal of protective skin 8.

After forming, the laminate is removed from the fixture and the protective sheet 8 is separated from support layer 1 to form sub-laminate 6 (see FIG. 5). Sub-laminate 6 is bonded to lens blanks 4 using the apparatus of FIG. 6.

Figure 6:
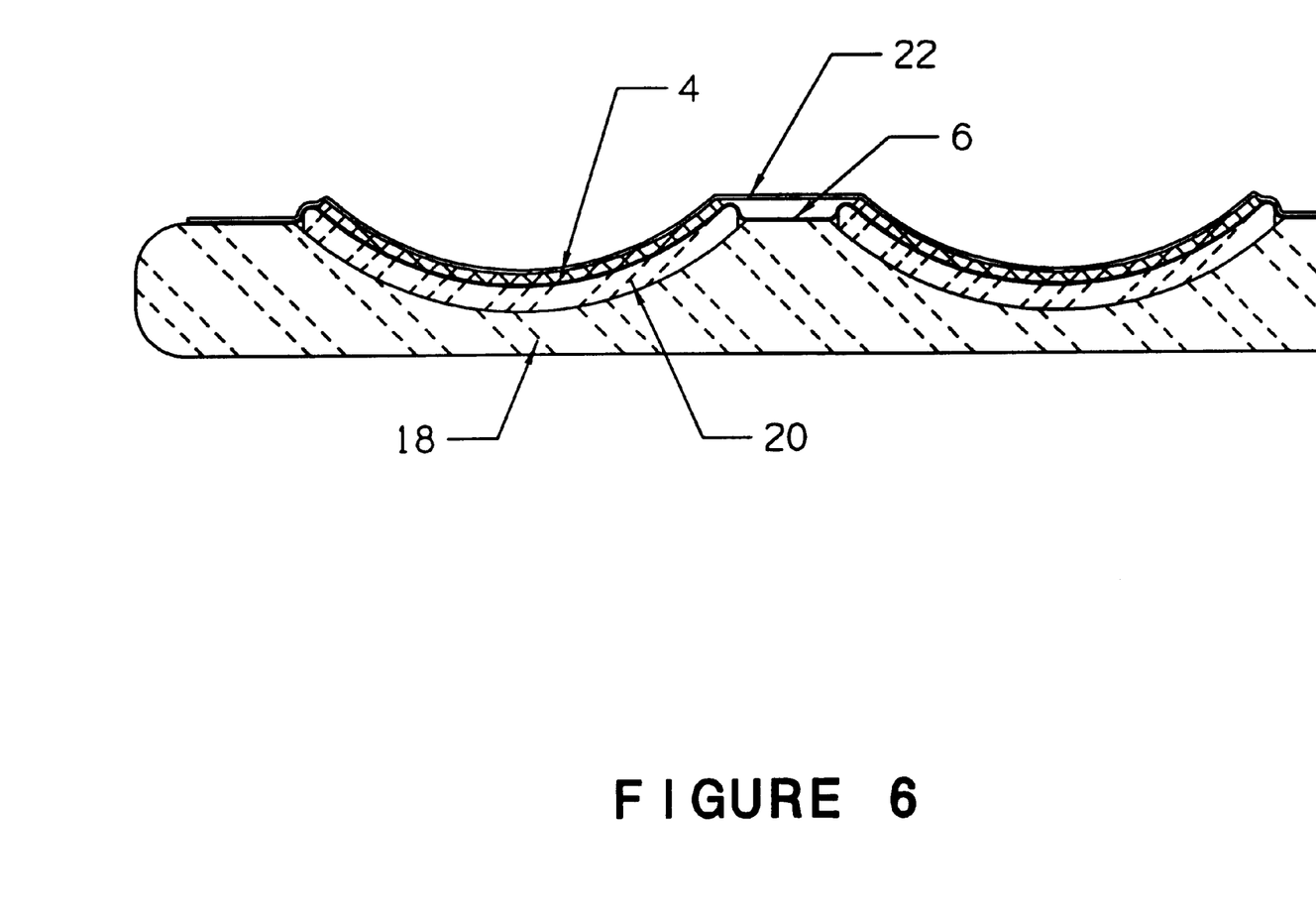
FIG. 6 is a cross-section view of (1) the light polarizing subassembly of the invention, (2) the lens blanks, and (3) their associated molding/bonding apparatus prior to autoclaving.
Figure 7:
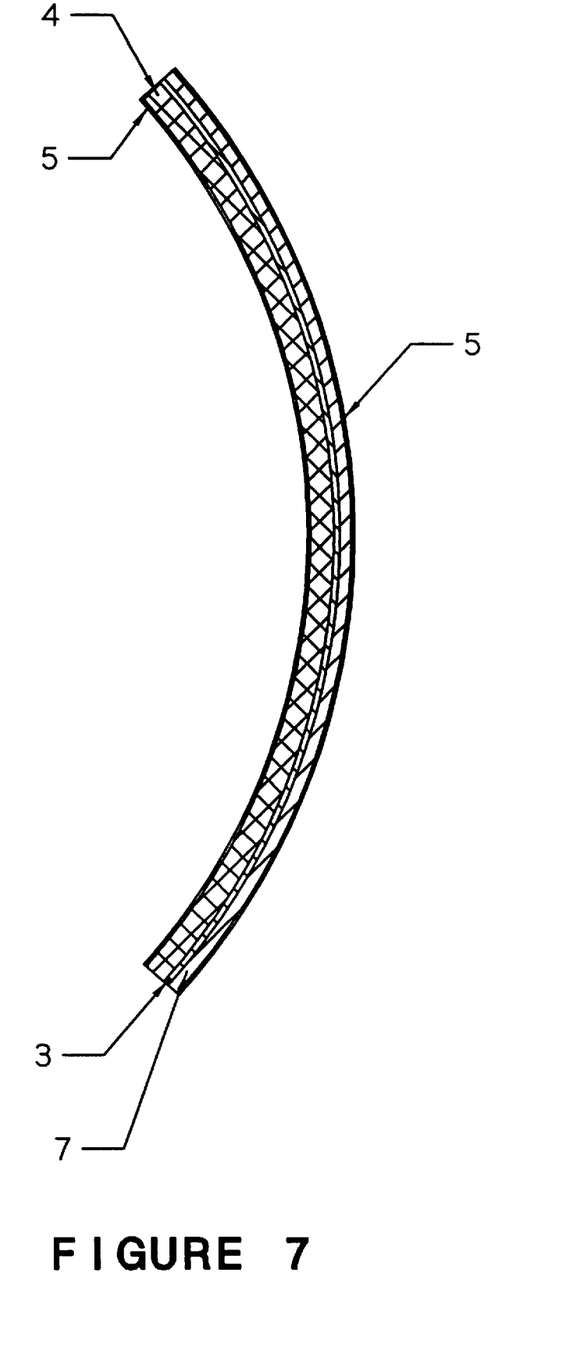
FIG. 7 is a cross-sectional view of a finished polarized ophthalmic lens constructed in accordance with the invention.
Figure 8:
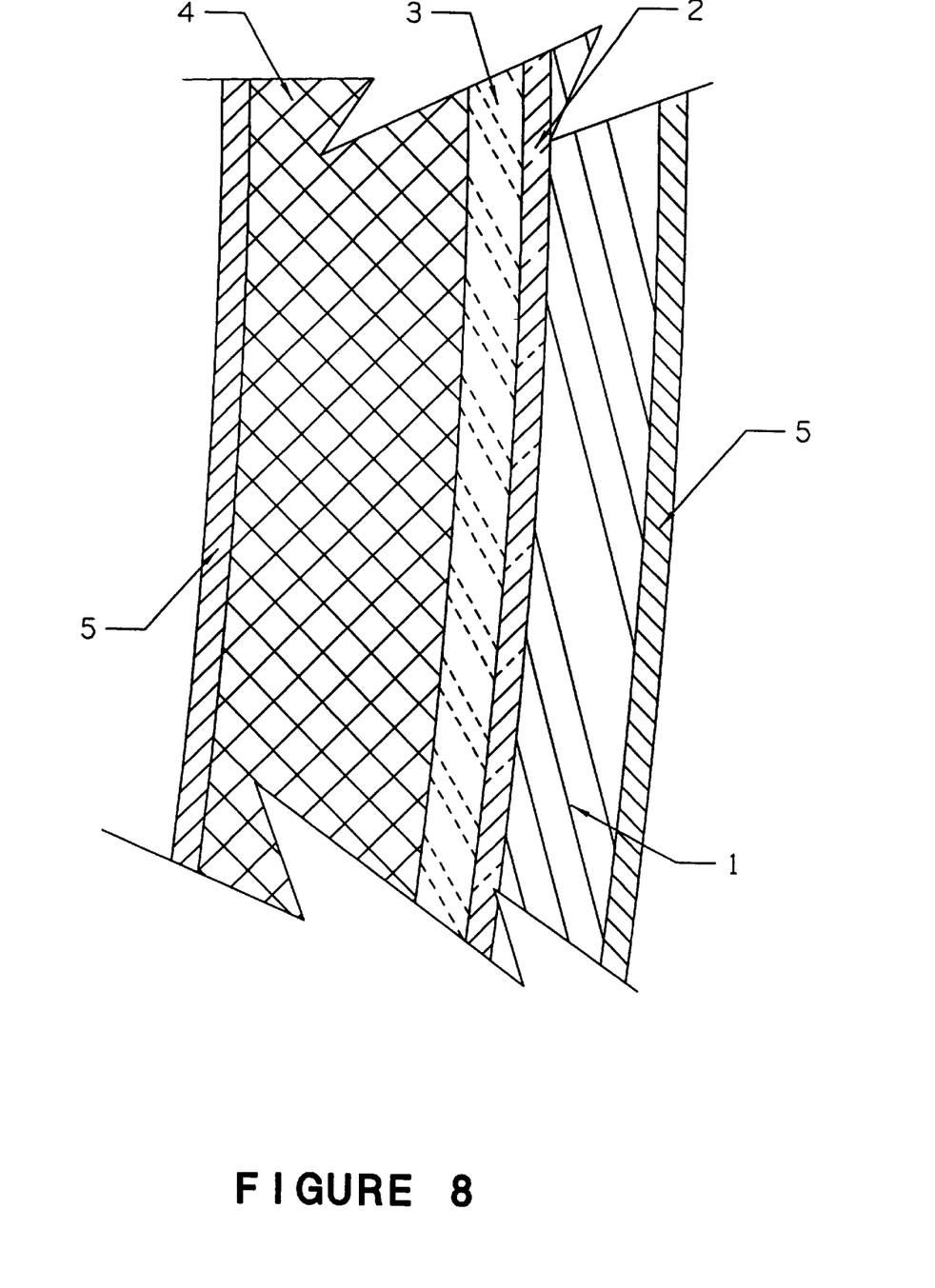
FIG. 8 is a magnified cross-sectional view of the lens of FIG. 7.

As shown in this figure, fixture 18 is used to hold precision glass molds 20 which, in turn, receive sub-laminate 6 and lens blanks 4. Fixture 18 can be a polypropylene sheet ("slab") of sufficient thickness to allow for machining of spherical concave cavities with centers which correspond to the spacing of the curved portions of the thermoformed sub-laminate. A silicone rubber sheet 22 is used as a vacuum blanket and is clamped in place over the assembled lenses prior to autoclaving. Various autoclaving conditions can be used as desired. Suitable values which have been found to work successfully in practice are a lamination temperature in the range from about 180° F. to about 260° F., a lamination pressure in the range from about 50 psi to about 250 psi, and a lamination time of between about 1 hour and about 1.5 hours.

Without intending to limit it in any manner, the present invention will be more fully described by the following examples.

EXAMPLE 1

Preparation of 6 Base Polarized Lenses

Minimally-borated polarized film was obtained in 13" wide rolls from Polarvision, Torrance Calif. (product number SF-2013 "Semi-Laminate" Gray Linear Polarized Film). The film was cut into sheets 18" long and the protective liner (Nitto Denko #3633) was removed from the PVA side of the film but left on the CTA side. The sheet was clamped into a stainless steel frame which overlapped all the edges of the sheet by approximately 0.5".

Coating of the polarized sheet with a silane coupling agent was accomplished by dipping the rack with the film clamped in place into a silane coating solution. The coating solution was prepared using the commercially available silane coupling agent, N-(2-aminoethyl)-3-aminopropyltrimethoxy-silane (United Chemical Technologies, Inc., Bristol, Pa.; catalog number A0700). A 95% ethanol, 5% water solution was prepared and used to dilute the stock solution to 2% by volume.

The polarized film was dipped into the coating solution at room temperature for 2 minutes, removed, and allowed to drain. The coated polarizer was then quickly rinsed in ethanol. After rinsing, the coated polarizer in the rack was placed in a convection oven and dried at 120° F. for 30 minutes.

Polyurethane adhesive film was purchased from Deerfield Polyurethane Company, Deerfield, Mass., (product number A4100) and was cut to the same size as the polarized film, i.e., 13"×18". The polarized film was removed from the rack and laminated to the polyurethane film using the hard rubber rollers described above. The adhesive film was laminated to the freshly coated side of the polarizer.

Forming of the polarized sheet was accomplished by clamping the laminate on the top plate of the vacuum chamber as described above so as to provide an air tight seal. The vacuum chamber was placed under a large infrared heater (Pyrex Radiant Heater, 2500 Watts). The spacing between the vacuum chamber and the heater was approximately 7". The heater surface temperature was 472° F. while the surface of the top plate was 180° F.

A vacuum of approximately 15" was applied to the vacuum chamber and the laminate was heated for 35 seconds under the heater and then quickly removed. The laminate "dropped" into the holes in the top plate and was measured and found to be a 6 base curve. The vacuum was released and the laminate was removed after cooling to room temperature.

Precision glass molds were obtained from Intercast Europe, Parma, Italy. The molds were 85 mm in diameter and 5 mm thick with a polished 6 base concave surface. Twelve glass molds were placed into twelve concave spherical cavities formed in a polypropylene "slab". The polarizing sub-laminate was placed on top of the slab with the curved portions of the sub-laminate aligned with the glass molds. A 6 base injection molded polycarbonate lens from Intercast Europe, Parma, Italy, was accurately placed in each concave cavity of the sub-laminate. The lenses had a diameter of 73 mm and a thickness of 2 mm. After placement of all the plastic lenses, the "slab" was covered with a 0.001" release film (Airtech International, Carson, Calif., product number A4000) followed by a silicone rubber vacuum blanket. The blanket was secured by clamps around all edges so as to provide an air tight seal. A vacuum hose was connected to the blanket and a vacuum drawn.

The evacuated "slab" was then placed into an autoclave for lamination. The lamination cycle used was as follows: 45 minute ramp up to 240° F. while the pressure was increased to 100 psi; level off and soak at 240° F. at 100 psi for 1 hour; hold at 100 psi while cooling to ambient temperature in 45 minutes; open the autoclave and remove "slab"; release vacuum and disassemble.

The polycarbonate lenses were now laminated to the polarizing sub-laminate. Each sheet had 12 lenses which were carefully cut out, followed by edge trimming. The lenses were then hardcoated using a UV curable polyacrylate. The resulting finished lenses were found to be highly resistant to delamination and to have excellent optical and light polarizing properties.

EXAMPLE 2

Preparation Of 8 Base Decentered Polarized Lenses

Eight-base decentered polarized lenses were prepared following the same procedures as those of Example 1 with the following changes: (1) the heating under the infrared heater was increased from 35 seconds to 45 seconds which resulted in a sub-laminate having curved portions of an 8 base radius, rather than a 6 base radius; (2) the precision glass molds had an 8 base concave surface instead of a 6 base surface; (3) 8 base injection molded optically corrected decentered polycarbonate lenses were used instead of 6 base centered lenses. The 8 base lenses had a diameter of 78 mm, a center thickness of 1.74 mm, a thick edge thickness of 1.90 mm, and a thin edge thickness of 1.61 mm. The lenses were placed in the sub-laminate with their thick edge/thin edge direction aligned with the machine direction of the PVA film. During autoclaving, the silicone rubber vacuum blanket easily accommodated the complex back surface of the decentered lenses.

As with the 6 base lenses, the process of the invention produced finished 8 base decentered lenses which were highly resistant to delamination and had excellent optical and light polarizing properties.

The foregoing examples demonstrate that the invention achieves its primary goals of providing a manufacturing technique for efficiently and inexpensively producing high quality polarized ophthalmic lenses. In summary, the advantages of the manufacturing process of the invention include:

1. The use of pre-formed injection molded polycarbonate lenses which are inexpensive and readily available and which provide the finished lens with impact and breakage resistance.
2. The use of precision polished glass molds which are readily available and inexpensive to define the convex surface of the finished lens.
3. The ability to readily produce finished lenses of a variety of types, including lenses having various base curves and optically corrected decentered lenses.
4. The ability of produce thin lenses suitable for fashion applications.
5. The ability to inexpensively form a polarizing sub-laminate of a desired curvature.
6. The ability to incorporate a dye or a UV absorber in a polyurethane adhesive film for custom applications.
7. The ability to provide a finished lens with an outer layer which is isotropic and thus does not produce unwanted birefringence.
8. The ability to produce both corrective and non-corrective lenses with excellent optical properties.

Although preferred and other embodiments of the invention have been described herein, further embodiments may be perceived by those skilled in the art without departing from the scope of the invention as defined by the following claims.

What is claimed is:
1. A method for producing a light polarizing sub-laminating comprising:
   (a) providing a sheet which comprises in order:
      (i) a light polarizing layer comprising a stretched polyvinyl alcohol film containing a polarizing dye,
      (ii) an isotropic support layer for the light polarizing layer, and
      (iii) a protective removable skin;
   (b) treating the light polarizing layer with a siloxane coupling agent;
   (c) laminating a polyurethane layer to the treated light polarizing layer;
   (d) forming at least one curved cavity in the sheet by supporting the sheet on a plate having at least one opening, heating the sheet, and applying a vacuum to the protective removable skin to pull a portion of the sheet into the at least one opening to form the at least one curved cavity; and
   e) removing the protective removable skin to form the light polarizing sub-laminate.
2. The method of claim 1 wherein the light polarizing layer is minimally borated.
3. A method for producing a light polarizing subassembly comprising:
   (a) providing a mold having at least one concave precision mold cavity;
   (b) inserting a light polarizing sub-laminate having a first surface and a second surface into the concave precision mold cavity with the first surface contacting the concave precision mold cavity and the second surface defining a concave cavity for receiving a lens blank;
   (c) inserting a lens blank into the concave cavity defined by the second surface; and
   (d) subjecting the concave precision mold cavity the light polarizing sub-laminate, and the lens blank to a vacuum and to autoclaving to form the light polarizing sub-laminate and the lens blank into the light polarizing subassembly, said autoclaving causing the first surface to acquire the shape of the concave precision mold cavity.
4. The method of claim 3 wherein the precision mold cavity is a polished glass surface.
5. The method of claim 3 wherein the light polarizing sub-laminate comprises:
   (i) a polyurethane layer which forms the second surface;
   (ii) a light polarizing layer bonded to the polyurethane layer; and
   (iii) an isotropic support layer for the light polarizing layer, said isotropic support layer being bonded to the light polarizing layer and forming the first surface.
6. The method of claim 5 wherein the light polarizing layer comprises a stretched polyvinyl alcohol film containing a polarizing dye, said film being treated with a siloxane coupling agent prior to bonding of the light polarizing layer to the polyurethane layer.
7. The method of claim 3 wherein the lens blank is an optically corrected decentered lens blank.
8. The method of claim 3 wherein the lens blank is a polycarbonate lens blank.
9. A method for producing a light polarizing subassembly comprising:
   (A) producing a light polarizing sub-laminate by:
      (i) providing a sheet which comprises in order:
         (a) a light polarizing layer comprising a stretched polyvinyl alcohol film containing a polarizing dye,

(b) an isotropic support layer for the light polarizing layer, and
(c) a protective removable skin;
(ii) treating the light polarizing layer with a siloxane coupling agent;
(iii) laminating a polyurethane layer to the treated light polarizing layer;
(iv) forming at least one curved cavity in the sheet by supporting the sheet on a plate having at least one opening, heating the sheet, and applying a vacuum to the protective removable skin to pull a portion of the sheet into the at least one opening to form the at least one cavity; and
(v) removing the protective removable skin to form the light polarizing sub-laminate;

(B) providing a mold having at least one concave precision mold cavity;
(C) inserting the light polarizing sub-laminate produced in step (A) into the precision mold cavity with the isotropic support layer contacting the concave precision mold cavity and the polyurethane layer defining a concave cavity for receiving a lens blank;
(D) inserting a lens blank into the concave cavity defined by the polyurethane layer; and
(E) autoclaving the light polarizing sub-laminate and the lens blank to form the light polarizing subassembly, said autoclaving causing the isotropic support layer to acquire the shape of the concave precision mold cavity.

* * * * *